(12) United States Patent
St. John

(10) Patent No.: US 11,987,213 B2
(45) Date of Patent: May 21, 2024

(54) TRUCK BED FISHING POLE HOLDER

(71) Applicant: Robert St. John, Saint Augustine, FL (US)

(72) Inventor: Robert St. John, Saint Augustine, FL (US)

( * ) Notice: Subject to any disclaimer, the term of this patent is extended or adjusted under 35 U.S.C. 154(b) by 30 days.

(21) Appl. No.: 17/880,716

(22) Filed: Aug. 4, 2022

(65) Prior Publication Data

US 2024/0042942 A1    Feb. 8, 2024

(51) Int. Cl.
*B60R 9/08* (2006.01)
*A01K 97/10* (2006.01)
*B60R 9/06* (2006.01)

(52) U.S. Cl.
CPC ............... *B60R 9/08* (2013.01); *A01K 97/10* (2013.01); *B60R 9/06* (2013.01)

(58) Field of Classification Search
CPC .............. B60R 9/06; B60R 9/08; A01K 97/10
USPC .......................................................... 224/404
See application file for complete search history.

(56) References Cited

U.S. PATENT DOCUMENTS

| | | | |
|---|---|---|---|
| 3,291,427 A | 12/1966 | Hutchngs | |
| 3,701,504 A * | 10/1972 | Woods | A01K 97/10 248/528 |
| 4,133,131 A * | 1/1979 | Davy | A01K 97/10 248/528 |
| 4,335,840 A | 6/1982 | Williams | |
| 4,479,322 A * | 10/1984 | Koppel | A01K 97/10 248/528 |
| 4,523,403 A * | 6/1985 | Ivy | A01K 97/125 43/17 |
| 4,696,122 A | 9/1987 | Van Der Zyl | |
| 4,881,674 A | 11/1989 | Medianik | |
| 5,152,494 A * | 10/1992 | Frunzar | A01K 97/08 248/513 |
| 5,205,446 A * | 4/1993 | Greenberg | B60R 9/08 224/511 |
| 5,435,473 A | 7/1995 | Larkum | |
| 5,571,227 A * | 11/1996 | Pisarek | A01K 97/10 248/513 |
| 5,842,615 A | 12/1998 | Goodness | |
| 6,360,902 B1 * | 3/2002 | Searles | A01K 97/10 211/70.8 |
| 7,219,464 B1 | 5/2007 | Kujawa | |
| 7,472,510 B1 | 1/2009 | Fasola | |
| 8,800,788 B1 | 8/2014 | Guidry | |
| 9,565,934 B2 * | 2/2017 | Hall, II | A47B 81/005 |
| 9,986,827 B1 * | 6/2018 | Long | A47B 81/005 |

(Continued)

*Primary Examiner* — Peter N Helvey
(74) *Attorney, Agent, or Firm* — Larson & Larson; Frank Liebenow; Justin P. Miller

(57) ABSTRACT

A fishing pole holder is disclosed including a main frame with a front and rear lateral member connected to each other by two side members. The front and rear lateral member extending beyond each of the side members by a distance (e.g., 4 inches to 12 inches) for straddling wheel wells of a truck bed. Two movable frames have side sections that are rotatably coupled to a respective one of the two side members by a pivot and have a plurality of tubular rod holders affixed thereto. Each of the movable frames rotate about each pivot between a first position in which the tubular rod holders are substantially perpendicular to side members and a second, locking position (e.g., using a pin) in which the tubular rod holders are at a non-zero angle with respect to the side members.

13 Claims, 12 Drawing Sheets

(56) References Cited

U.S. PATENT DOCUMENTS

| | | | |
|---|---|---|---|
| 10,182,653 B1* | 1/2019 | Long | A47B 81/005 |
| 2014/0110363 A1 | 4/2014 | Brown et al. | |
| 2014/0332655 A1* | 11/2014 | Colbert | B60R 9/06 |
| | | | 224/519 |
| 2016/0045024 A1* | 2/2016 | Roberts | A47B 81/005 |
| | | | 248/512 |
| 2020/0253377 A1 | 8/2020 | Neese | |
| 2022/0032854 A1* | 2/2022 | Burke | B60R 9/10 |
| 2022/0134961 A1 | 5/2022 | Gwinn | |
| 2022/0314894 A1* | 10/2022 | Viklund | A01K 97/10 |

\* cited by examiner

TRUCK BED FISHING POLE HOLDER

FIELD

This invention relates to the field of fishing and more particularly to a system for holding and organizing fishing poles in a truck bed.

BACKGROUND

Many people that fish (e.g., fishermen) have a large collection of fishing poles, often a dozen fishing poles or more. Each fishing pole and reel combination is typically unique and rigged for catching certain species of fish in certain environments.

As many people that fish often travel by vehicle to the location of fishing, many of these fishing poles need to be transported to that location. As there is often a large investment in each fishing pole and reel, it is important not to damage them during transit. Further, having so many fishing poles and reels, often pre-rigged, it is easy for neighboring fishing poles to become entangled, taking time when arriving at the fishing location to detangle a mess of fishing poles and riggings, as in the past, several fishing poles were often just placed in the bed of a pickup truck at the mercy of sharp turns and quick stops.

To help alleviate this problem, solutions of the past included fishing pole holders that bolt onto the truck bed or have metal brackets that straddle the tail gate or truck bed wall. The former is often undesirable because the truck is often used for other purposes and the mounted fishing pole holder will impede such other uses. The latter is often undesirable because the metal bracket will often impact the paint where installed leading to paint damage and rust.

What is needed is a fishing pole holder that will remain stable while in a truck bed, will easily transfer between the truck bed and storage, and will allow use of the truck bed when not holding fishing poles.

SUMMARY

The present invention improves over the prior art by providing a fishing pole holder having two rows of rod holders, each row held by a movable frame and each movable frame interfaced to a main frame by pivots such that each row has two positions. In a first position, the rod holders lay flat (e.g., for storage or for using the truck bed to carry other objects) and in a second position, the rod holders extend upwardly at an angle for holding a fishing pole in each. The frame has handles for carrying and legs that extend laterally and are spaced apart to straddle opposing wheel wells of the truck bed, thereby eliminating any need to fasten the fishing pole holder to the truck bed. When the movable frames are in the first position, the fishing pole holder is substantially flat, permitting the truck bed to be used for carrying other objects while the fishing pole holder is present.

In one embodiment, a fishing pole holder is disclosed including a main frame that has a front lateral member and a rear lateral member connected to each other by two side members such that ends of each of the two side members are connected to a respective front lateral member and rear lateral member at substantially right angles and such that the front lateral member and the rear lateral member extend beyond each of the side members by a distance for straddling wheel wells of a truck bed (e.g., a distance of between 4 and 12 inches). The fishing pole holder further includes two movable frames, each has two side sections, and each side section is rotatably coupled to a respective one of the two side members. Each of the two movable frames have a plurality of tubular rod holders affixed thereto, each for accepting a fishing pole. Each of the two movable frames are rotatable between a first position in which the tubular rod holders are substantially parallel (e.g., within 5 degrees) to side members and a second position in which the tubular rod holders are at a non-zero angle with respect to the side members.

In another embodiment, a method of holding fishing poles on a truck bed is disclosed including providing a fishing pole holder that has a main frame having a front lateral member and a rear lateral member connected to each other by two side members such that ends of each of the two side members connected to a respective front lateral member and rear lateral member at substantially right angles and the front lateral member and the rear lateral member extending beyond each of the side members by a distance. The fishing pole holder also comprising two movable frames, each movable frame having a side section and each side section is rotatably coupled to a respective one of the two side members. A plurality of tubular rod holders is affixed to each of the two movable frames. The method includes placing the fishing pole holder on a floor of a bed of the truck such that the front lateral member and the rear lateral member extending beyond each of the side members straddle opposing wheel wells of the truck. To accept the rod portion of the fishing poles, each of the two movable frames are rotated to a position in which the tubular rod holders are at a non-zero angle with respect to the side members and then one or more rods of fishing poles are inserted into in each of the tubular rod holders.

In another embodiment, an apparatus for holding fishing poles is disclosed including a main frame having a front lateral member and a rear lateral member connected to each other by two side members. Ends of each of the two side members are connected to a respective front lateral member and rear lateral member at substantially right angles. The front lateral member and the rear lateral member extending beyond each of the side members by a distance (e.g., 4 inches to 12 inches) for straddling wheel wells of a truck bed. Two movable frames are included, each have a side section that is rotatably coupled to a respective one of the two side members by a pivot and each of the two movable frames have a plurality of tubular rod holders affixed thereto, each for accepting a fishing pole. Each of the two movable frames are rotatable about each pivot between a first position in which the tubular rod holders are substantially parallel (e.g., within 5 degrees) to side members and a second position in which the tubular rod holders are at a non-zero angle with respect to the side members and a hole passing through each of the side sections and the side member sized to accept a locking pin for locking the tubular rod holders in the second position.

In another embodiment, a fishing pole holder is disclosed including a main frame that has a front lateral member and a rear lateral member connected to each other by two side members such that ends of each of the two side members are connected to a respective front lateral member and rear lateral member at substantially right angles and such that the front lateral member and the rear lateral member extend beyond each of the side members by a distance for straddling wheel wells of a truck bed (e.g., a distance of between 4 and 12 inches). The fishing pole holder further includes two stationary frames, each has two side sections, and each side section is affixed to a respective one of the two side members. Each of the two stationary frames have a plurality of tubular rod holders affixed thereto, each for accepting a fishing pole. Each of the two movable frames are at a non-zero angle with respect to the side members.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
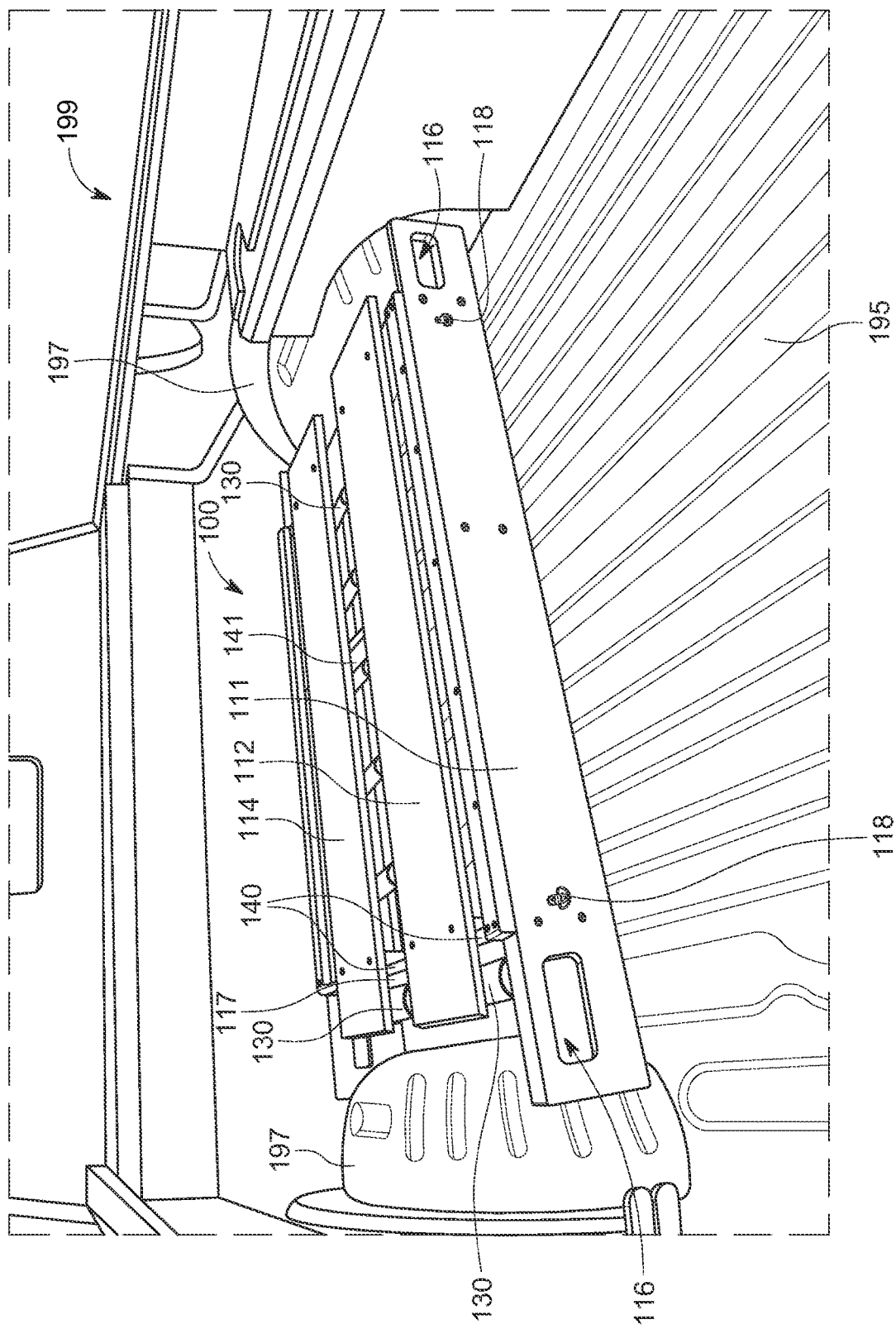
FIGS. 1-12 illustrate perspective views of a fishing pole holder from various angles and sides installed in a truck bed or out of the truck bed.

Reference will now be made in detail to the presently preferred embodiments of the invention, examples of which are illustrated in the accompanying drawings. Throughout the following detailed description, the same reference numerals refer to the same elements in all figures.

Although the fishing pole holder is shown being used in a pickup truck bed with the frame legs straddling the wheel wells of the pickup truck bed, there are no limitations as to where the fishing pole holder is to be used. For example, it is anticipated that the fishing pole holder operate in a free-standing mode (e.g., resting on a road or driveway) for washing the fishing poles and reels with a water hose. Likewise, when in the first position in which the rod holders lay flat (e.g., absent of fishing poles), it is anticipated that the fishing pole holder will be stored in an upright orientation, for example against a garage wall.

Referring to FIGS. 1-12, perspective views of a fishing pole holder 100 from various angles and sides are shown. In FIGS. 1-9, the fishing pole holder 100 is shown installed in on the floor 195 of a truck bed 199 while in FIGS. 10-12, the fishing pole holder 100 is shown external to the truck bed, for example, resting on a surface (e.g., a road surface or driveway).

In the embodiment shown, there are two rows of rod holders 130. One row of rod holders 130 are held by a first movable frame 112 and a second row of rod holders 130 are held by a second movable frame 114. Each movable frame 112/114 includes a side section 140 and optionally an optional central support member 141. The side section 140 of each movable frame 112/114 is interfaced to a main frame 110 by pivots 122 such that each movable frame 112/114 has two positions that are independent of each other. In a first position, the respective movable frame 112/114 lays flat with respect to the main frame 110 (e.g., for storage). In the second position, each movable frame 112/114 extends upwardly at an angle from the main frame 110, allowing for a fishing pole 188 to be inserted in each rod holder 130. A pin 142 is provided to pass through a hole 143 that is bored through a side section 140 of each movable frame 112/114 and through a side member 117 of the main frame 110 to hold/lock the movable frame 112/114 in the desired position with respect to the main frame 110.

The main frame 110 has lateral members 111/113 and side members 117. The side members 117 include a least one hole 143 that aligns with at least one hole in an adjacent side member 117 for accepting a pin 142 for locking the movable frames 112/114 in the desired position. In embodiments having optional supports 144 (see FIG. 6) for the movable frames 112/114, an optional central support member 141 of the main frame 110 has notches 145 that accept the optional support 144 when the movable frames 112/114 are in the first position (e.g., relatively flat).

The lateral members 111/113 of the main frame 110 extend laterally beyond the side sections 140 by a distance 120 (see FIG. 3) that provides stability by straddling the wheel wells 197 of the truck bed 199. For example, by a distance of between 4 inches and 12 inches. In some embodiments, the lateral members 111/113 each have one or more cutouts 116 that are useful as handles for moving/carrying the fishing pole holder 100.

The lateral members 111/113 are spaced apart and extend sufficiently beyond the side members for straddling opposing wheel wells 197 of the truck bed 199, thereby reducing or eliminating any need to fasten the fishing pole holder 100 to the truck bed 199. By straddling the wheel wells 197, the fishing pole holder 100 installs/removes easily and quickly without fasteners or tools. In some embodiments tie-downs 118 are provided for extra security, for example, when storing the fishing pole holder 100.

Figure 2:
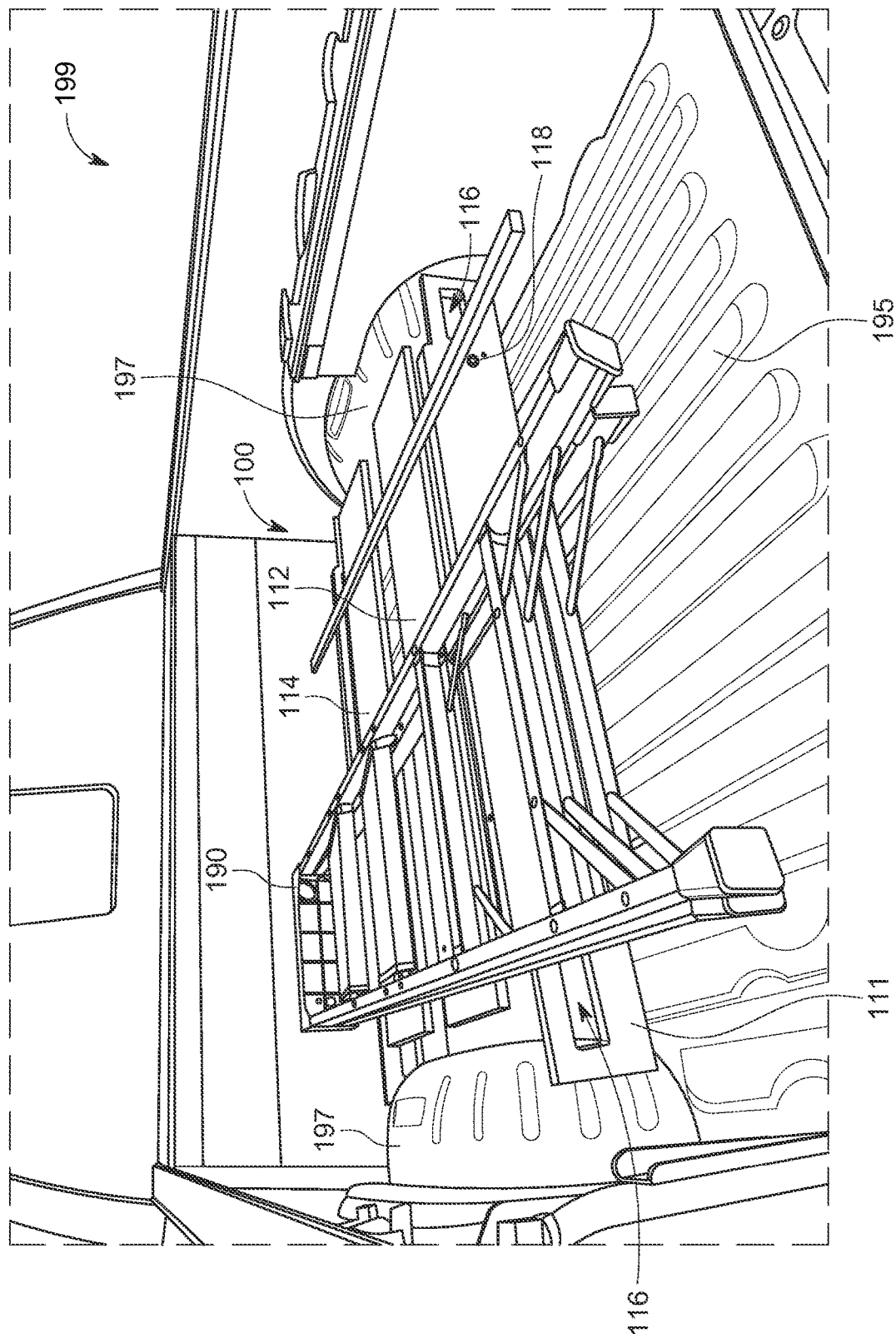
Figure 3:
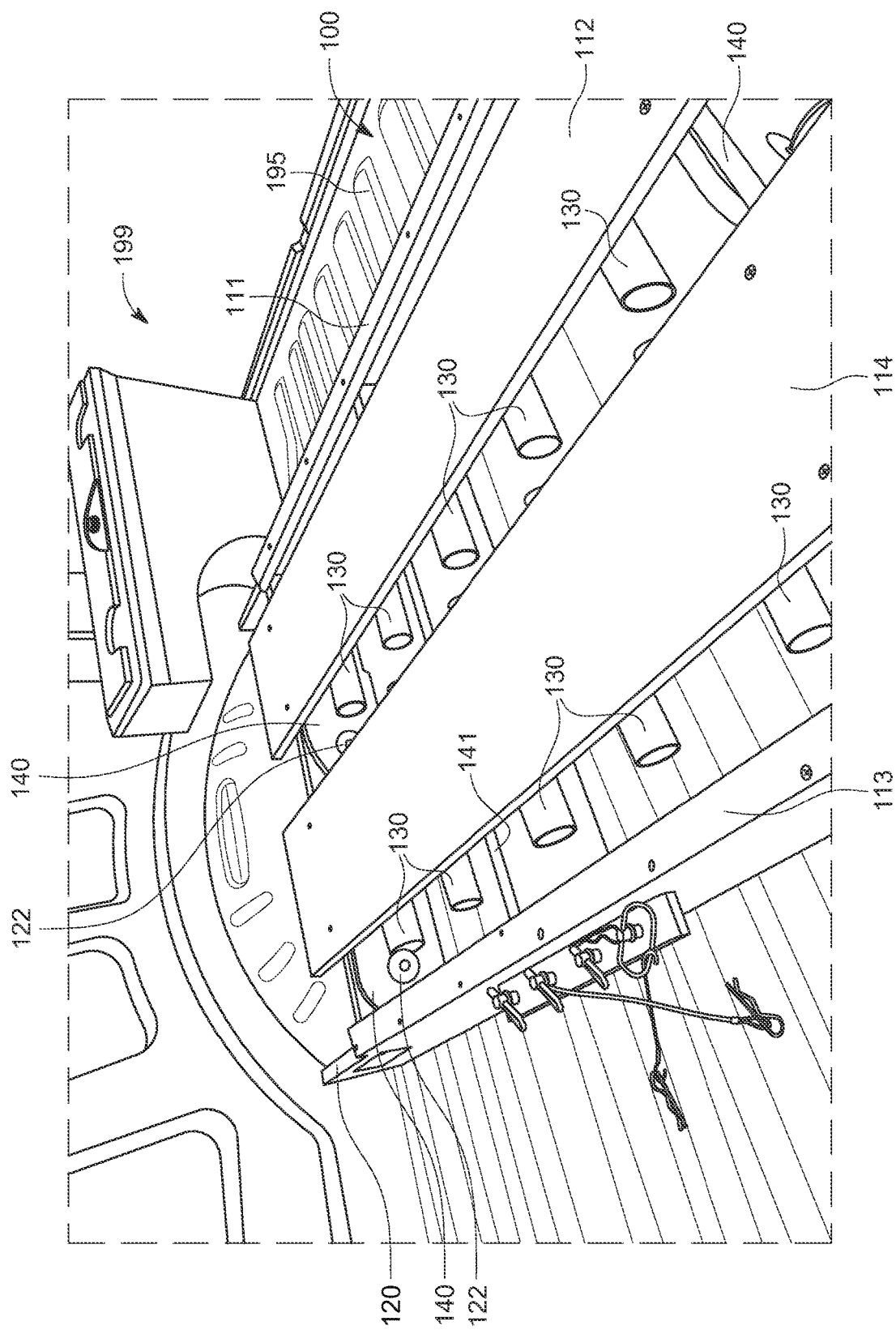
Figure 4:
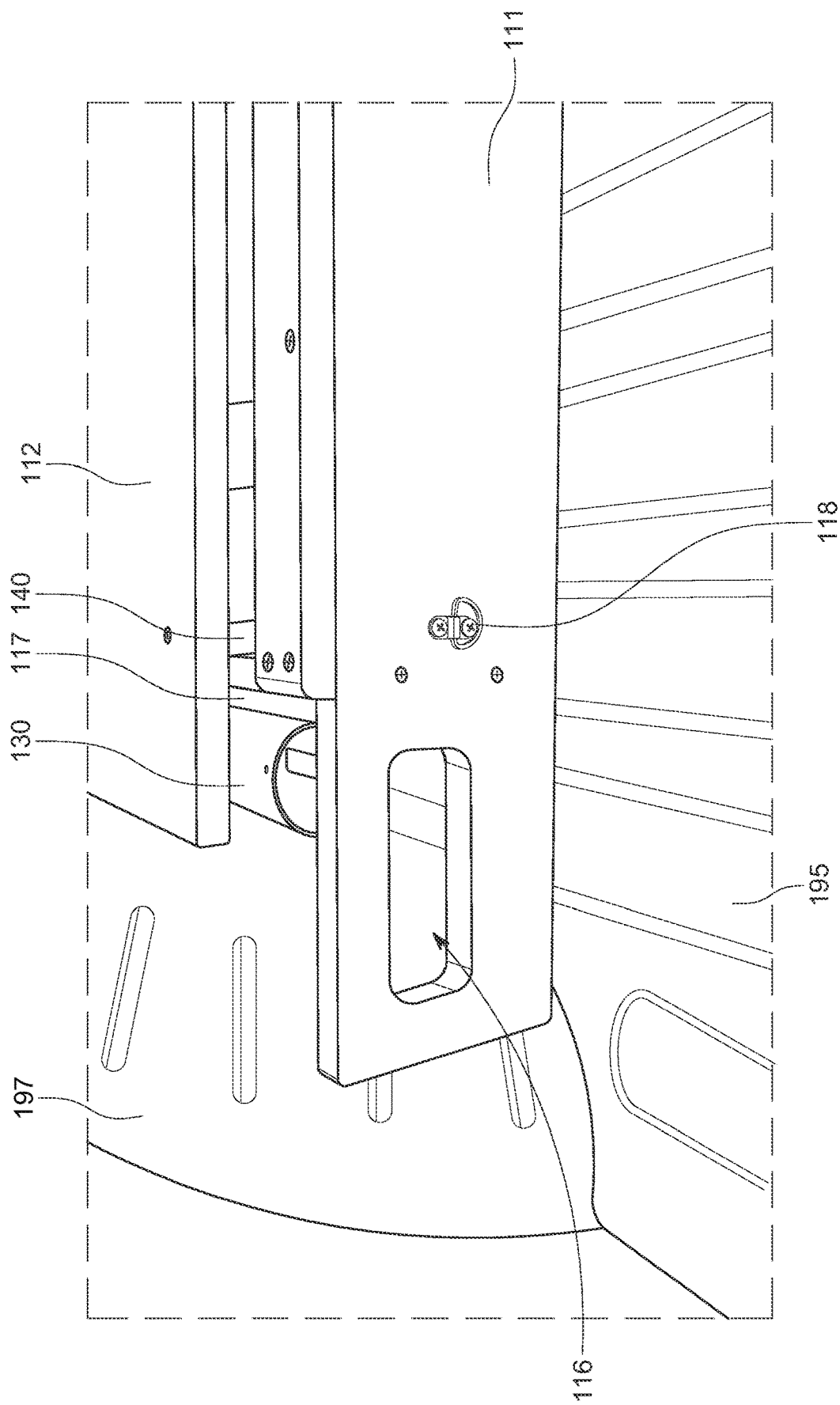
Figure 5:
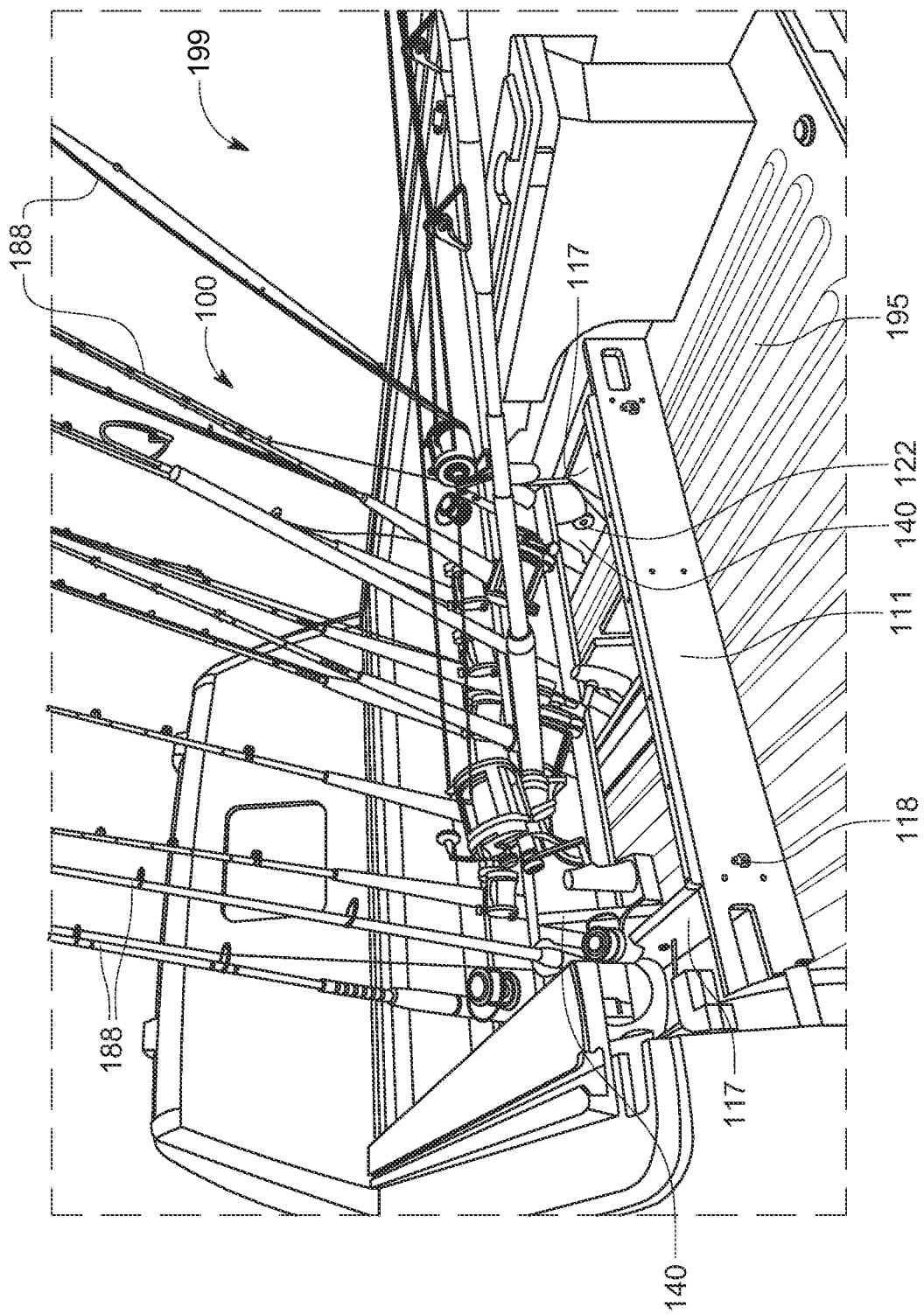
Figure 6:
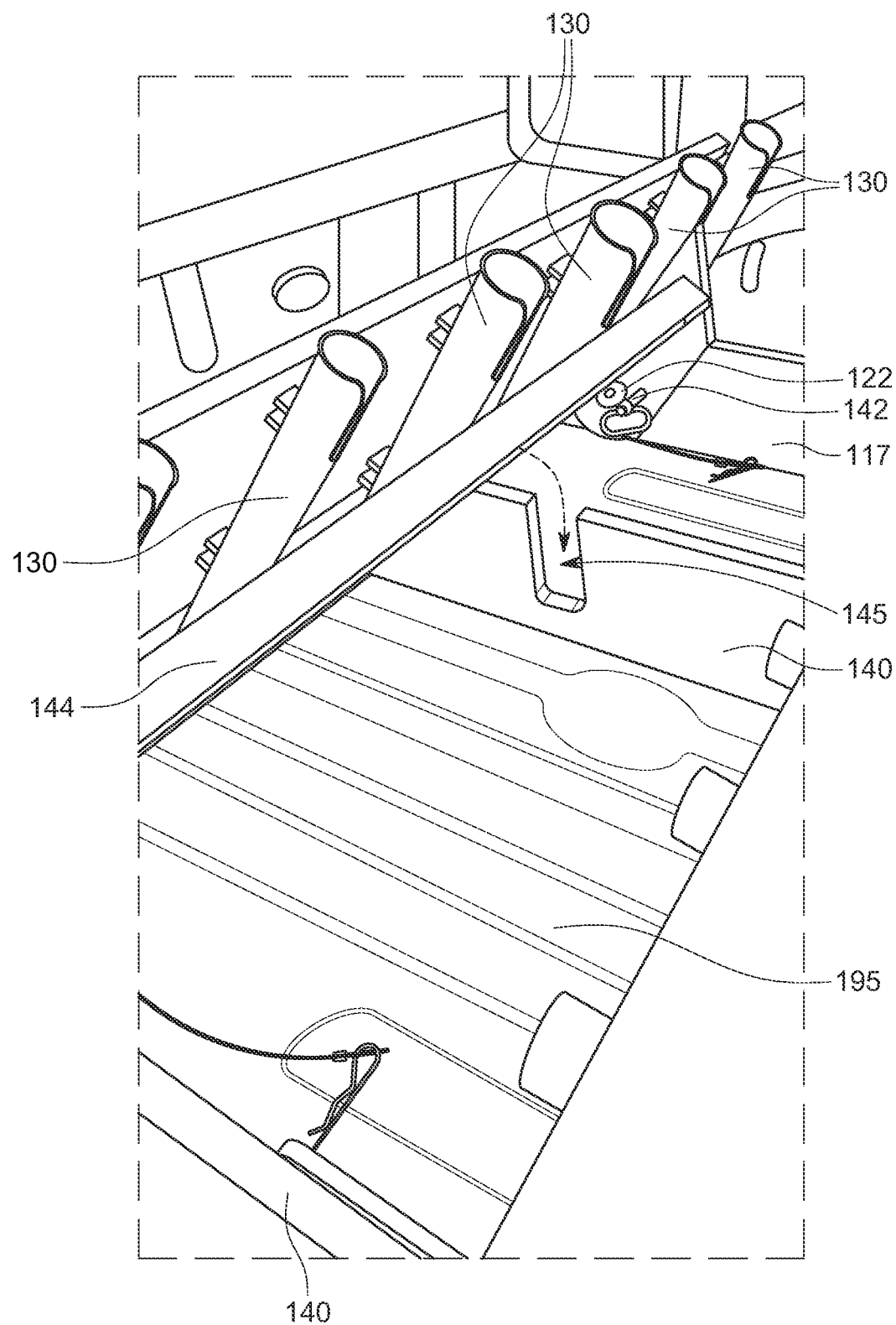
Figure 7:
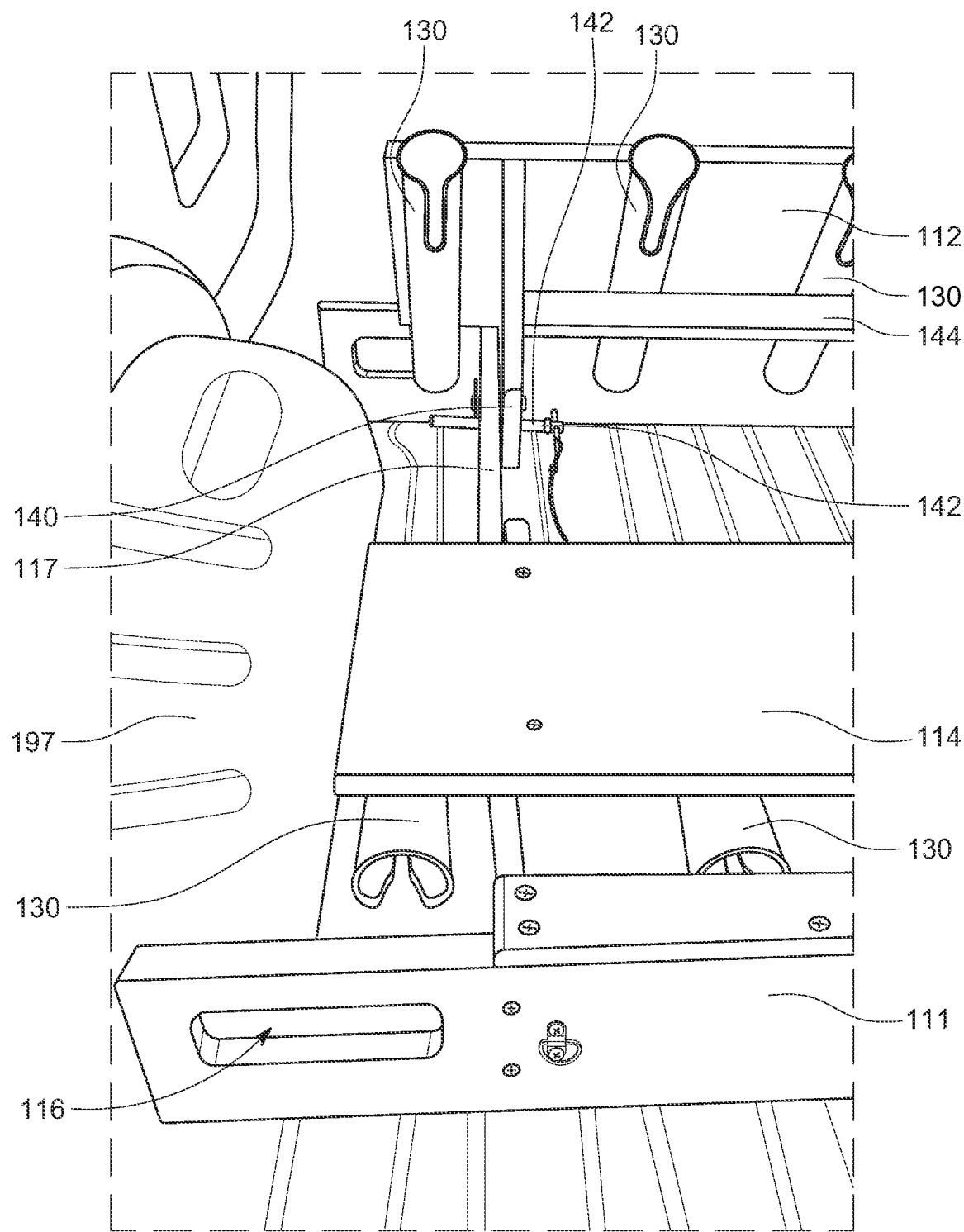
Figure 8:
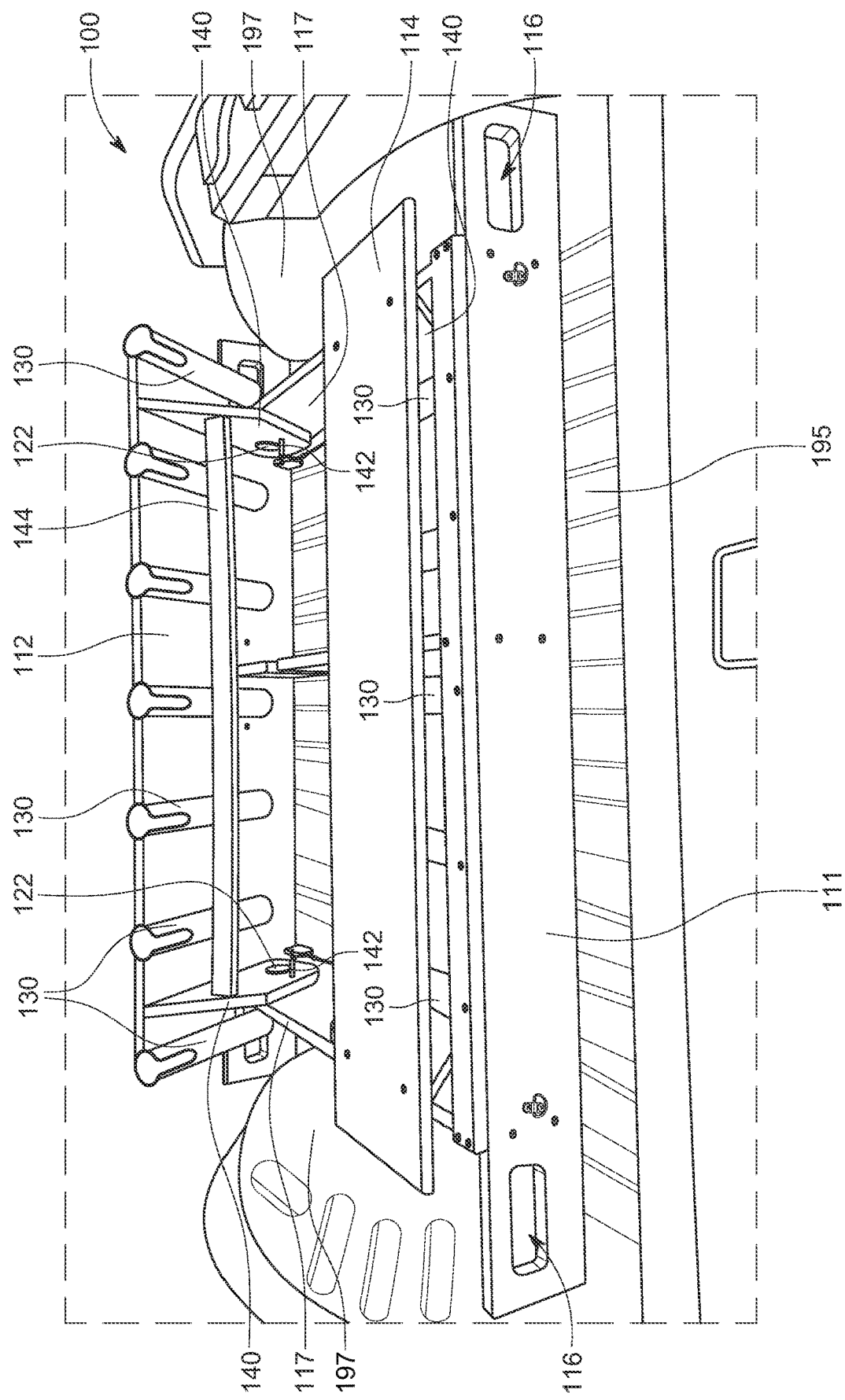
Figure 9:
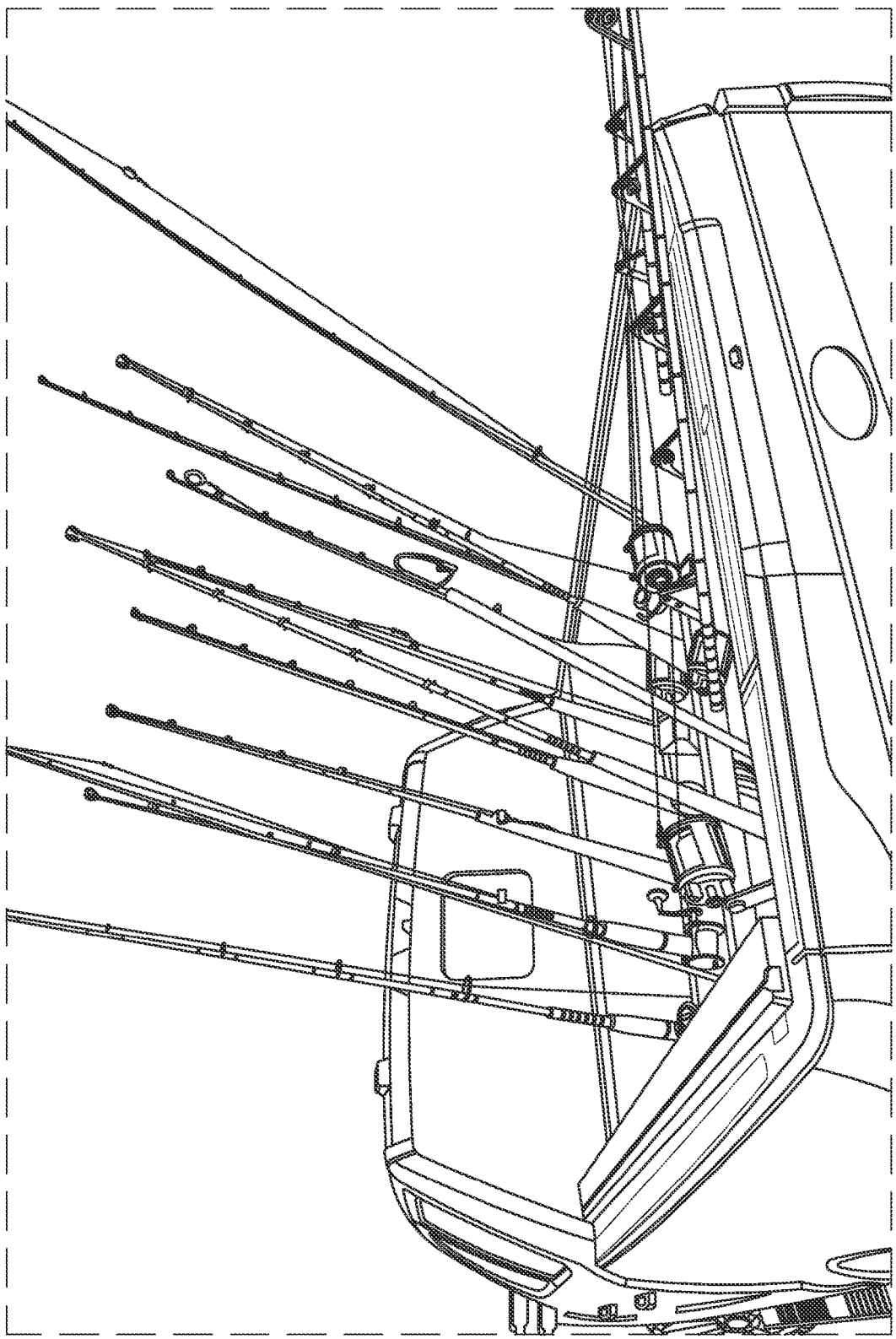
Figure 10:
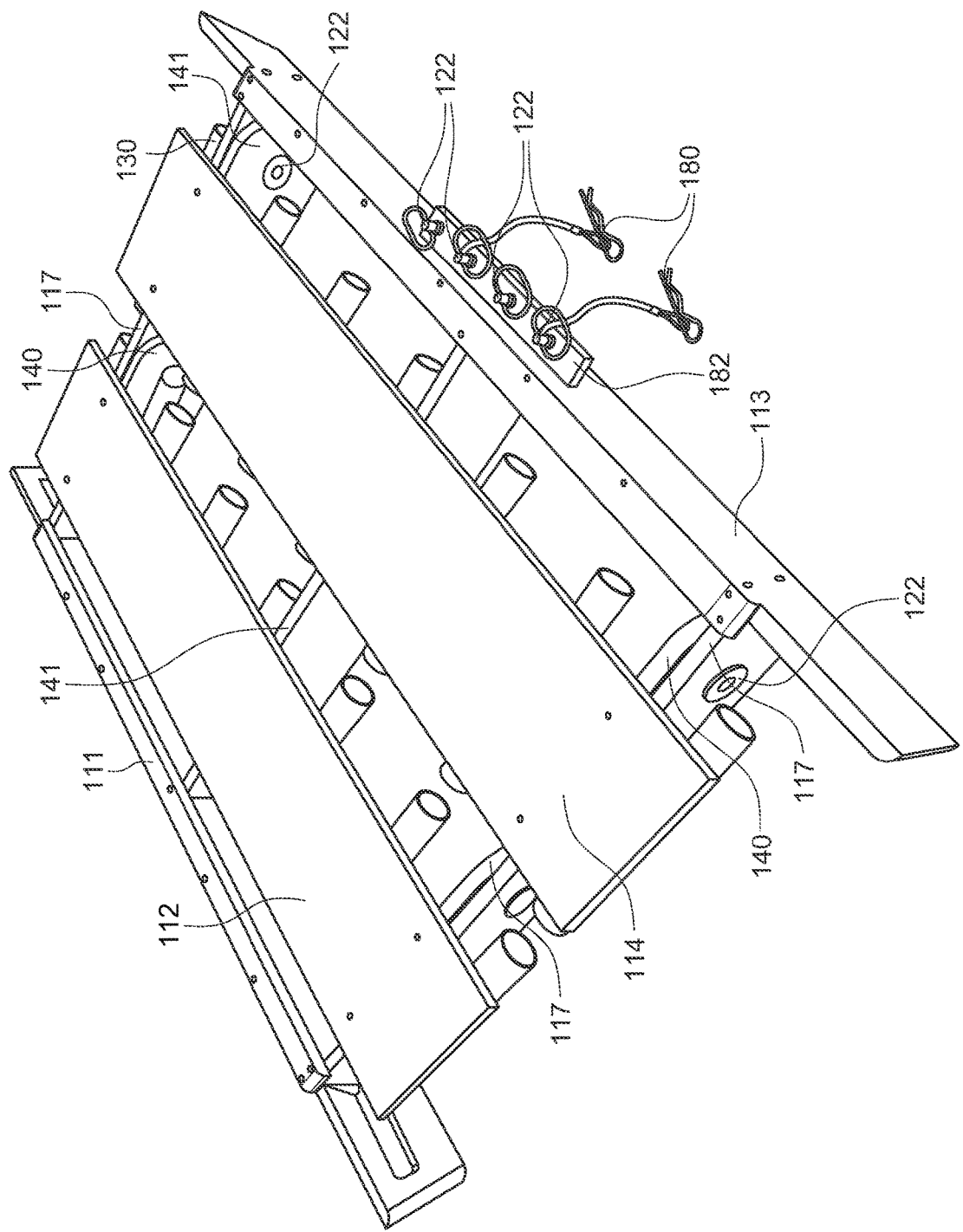
Figure 11:
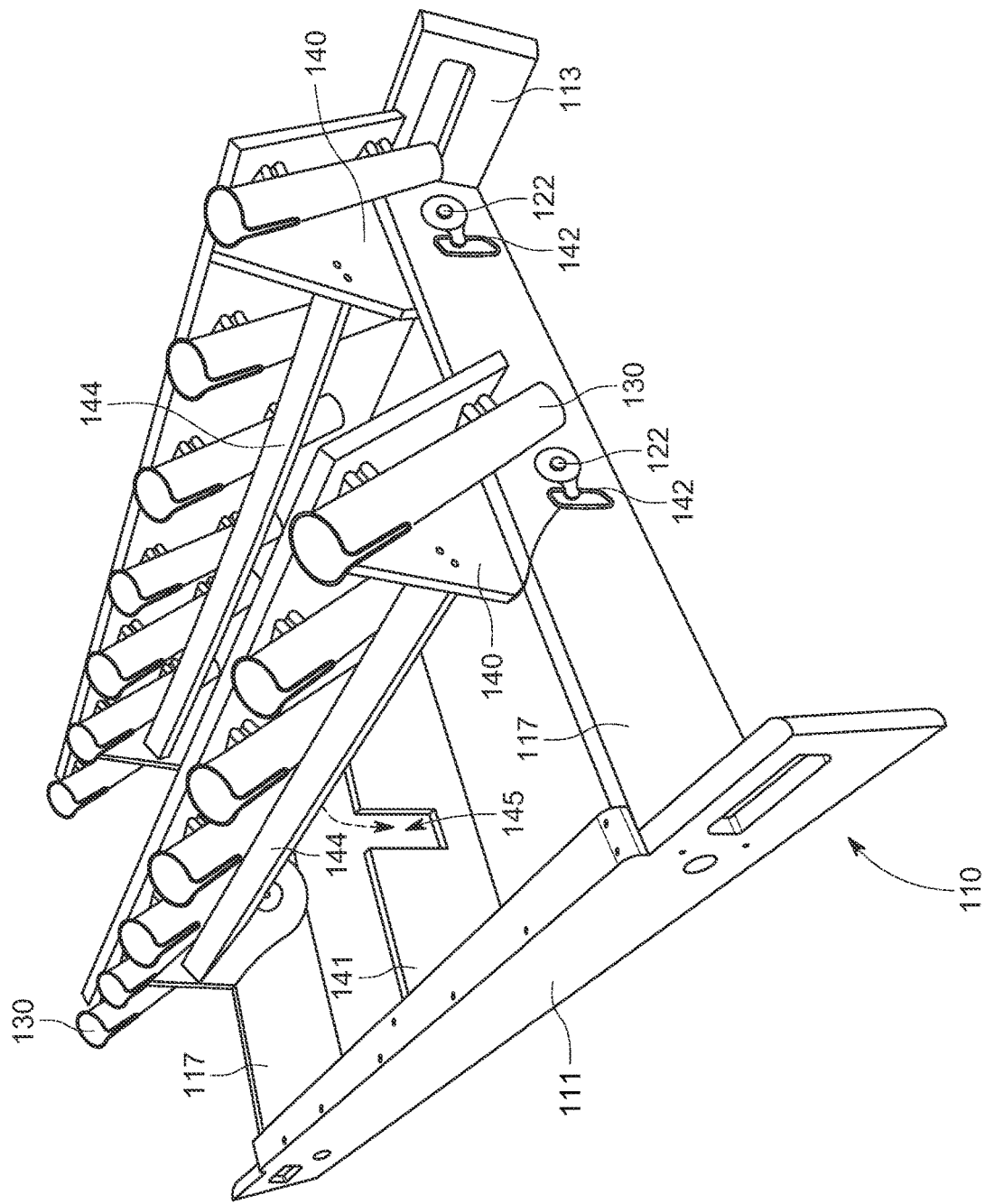
Figure 12:
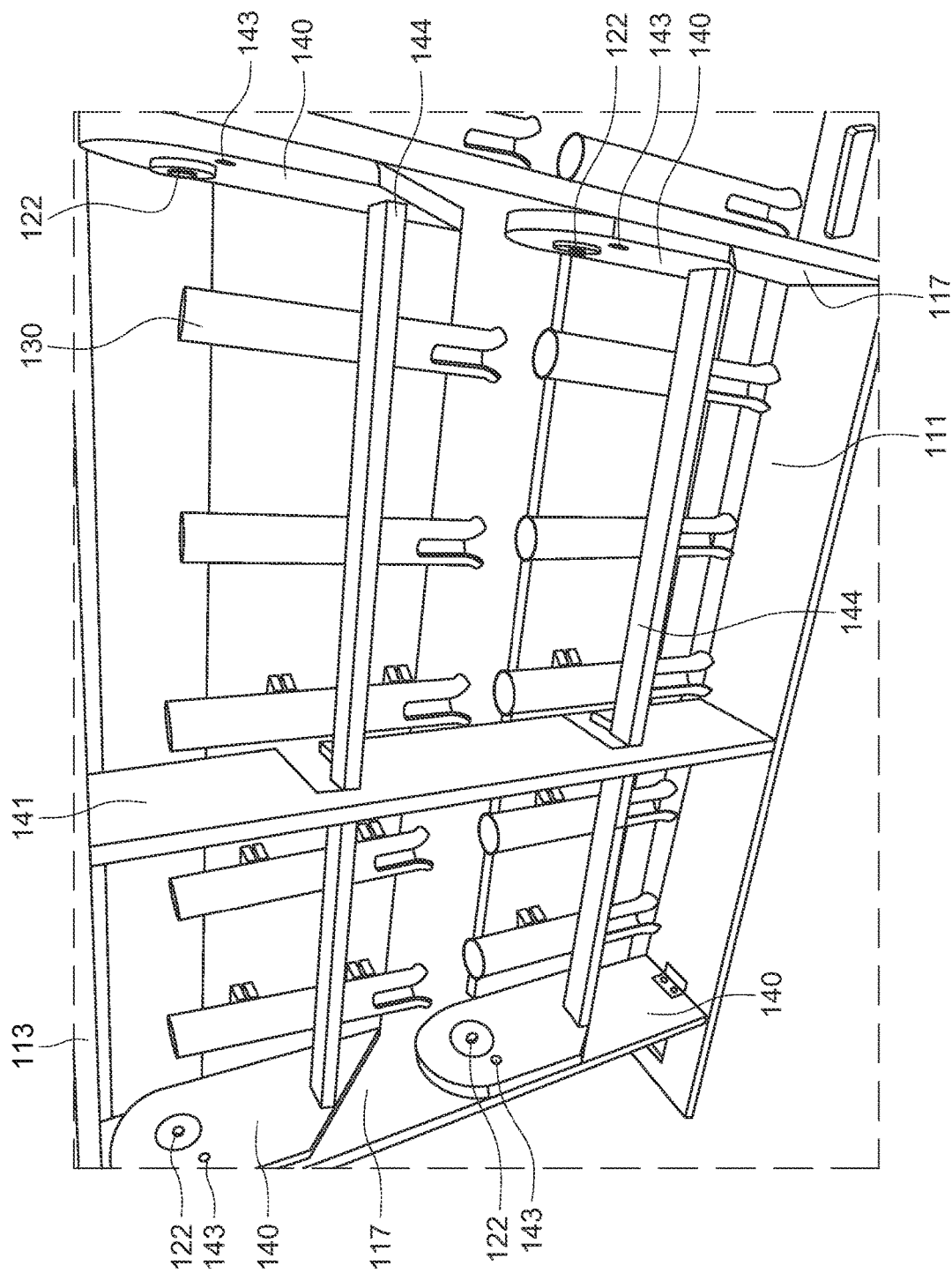

When in the first position (e.g., retracted), the fishing pole holder 100 is not holding any fishing poles 188 and is relatively flat with respect to the floor 195 of the truck bed 199, allowing for other objects to be carried upon the fishing pole holder 100, as for example, a ladder 190 as shown in FIG. 2.

In some embodiments, a shelf 182 is provided for storage of pins 142 and optional cotter pins 180.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A fishing pole holder comprising:
   a main frame having a front lateral member and a rear lateral member connected to each other by two side members, ends of each of the two side members connected to a respective front lateral member and rear lateral member at substantially right angles, the front lateral member and the rear lateral member extending beyond each of the side members by a distance for straddling wheel wells of a truck bed;
   two movable frames, each movable frame has two side sections and each side section is rotatably coupled to a respective one of the two side members;
   each of the two movable frames have a plurality of tubular rod holders affixed thereto, each for accepting a fishing pole; and
   whereas each of the two movable frames are rotatable between a first position in which the tubular rod holders are within five degrees of being parallel to side members and a second position in which the tubular rod holders are at a non-zero angle with respect to the side members.

2. The fishing pole holder of claim 1, wherein the distance is between four inches and twelve inches.

3. The fishing pole holder of claim 1, further comprising apertures formed in the front lateral member and the rear lateral member in an area where the front lateral member and the rear lateral member extend beyond each of the side members for carrying the fishing pole holder.

4. The fishing pole holder of claim 1, further comprising a hole passing through each of the side sections and the side member sized to accept a locking pin and the locking pin positioned in the hole when the movable frame is in the second position for locking the movable frame in the second position.

5. A method of holding fishing poles on a truck bed comprising:
providing a fishing pole holder that has a main frame having a front lateral member and a rear lateral member connected to each other by two side members such that ends of each of the two side members connected a respective front lateral member and rear lateral member at substantially right angles and the front lateral member and the rear lateral member extending beyond each of the side members by a distance, the fishing pole holder also comprising two movable frames, each movable frame having a side section and each side section is rotatably coupled to a respective one of the two side members, and each of the two movable frames having a plurality of tubular rod holders affixed thereto;
placing the fishing pole holder on a floor of the truck bed such that the front lateral member and the rear lateral member extending beyond each of the side members straddle opposing wheel wells of the truck bed;
rotating each of the two movable frames to a position in which the tubular rod holders are at a non-zero angle with respect to the side members; and
placing one or more rods of fishing poles in each of the tubular rod holders.

6. The method of claim 5, further comprising inserting locking pins into holes passing through each of the side sections and the side member, the holes are sized to accept the locking pins, thereby locking each of the two movable frames to the position in which the tubular rod holders are at a non-zero angle with respect to the side members.

7. The method of claim 5, wherein the distance is between four inches and twelve inches.

8. The method of claim 5, further comprising apertures formed in the front lateral member and the rear lateral member in an area where the front lateral member and the rear lateral member extend beyond each of the side members for carrying the fishing pole holder.

9. An apparatus for holding fishing poles comprising:
a main frame has a front lateral member and a rear lateral member connected to each other by two side members, ends of each of the two side members are connected a respective front lateral member and rear lateral member at substantially right angles, the front lateral member and the rear lateral member extending beyond each of the side members by a distance for straddling wheel wells of a truck bed;
two movable frames, each movable frame has two side sections and each side section is rotatably coupled to a respective one of the two side members by a pivot;
each of the two movable frames have a plurality of tubular rod holders affixed thereto, each for accepting a fishing pole;
whereas each of the two movable frames are rotatable about each pivot between a first position in which the tubular rod holders are within five degrees of being parallel to side members and a second position in which the tubular rod holders are at a non-zero angle with respect to the side members; and
a hole passing through each of the side sections and the side member sized to accept a locking pin.

10. The apparatus for holding fishing poles of claim 9, wherein the distance is between four inches and twelve inches.

11. The apparatus for holding fishing poles of claim 9, further comprising apertures formed in the front lateral member and the rear lateral member in an area where the front lateral member and the rear lateral member extend beyond each of the side members for carrying the apparatus for holding fishing poles.

12. The apparatus for holding fishing poles of claim 9, further comprising the locking pin inserted into the hole when each of the movable frame is in the second position for locking the movable frame in the second position.

13. The apparatus for holding fishing poles of claim 9, further comprising a support running parallel with the two side members, one end of the support connected to the front lateral member and an opposing second end connected to the rear lateral member.

* * * * *